US012640580B2

(12) United States Patent
Gariepy et al.

(10) Patent No.: US 12,640,580 B2
(45) Date of Patent: May 26, 2026

(54) COUPLING AIRCRAFT ELECTRIC POWER SUPPLY TO LOAD

(71) Applicant: Pratt & Whitney Canada Corp., Longueuil (CA)

(72) Inventors: Raphael Gariepy, Montreal (CA); Simon Lam, Scarborough (CA); Fraz Ahmad Kharal, Brampton (CA); Remi Robache, Montreal (CA); Antwan Shenouda, Mississauga (CA)

(73) Assignee: Pratt & Whitney Canada Corp., Longueuil (CA)

( * ) Notice: Subject to any disclaimer, the term of this patent is extended or adjusted under 35 U.S.C. 154(b) by 160 days.

(21) Appl. No.: 18/417,821

(22) Filed: Jan. 19, 2024

(65) Prior Publication Data

US 2025/0239876 A1 Jul. 24, 2025

(51) Int. Cl.
| | |
|---|---|
| *H02J 7/00* | (2026.01) |
| *B60L 50/50* | (2019.01) |
| *B64D 27/33* | (2024.01) |
| *H02J 4/00* | (2026.01) |
| *H02J 7/50* | (2026.01) |
| *H02J 7/90* | (2026.01) |

(52) U.S. Cl.
CPC ............. *H02J 7/933* (2026.01); *B60L 50/50* (2019.02); *B64D 27/33* (2024.01); *H02J 4/00* (2013.01); *H02J 7/50* (2026.01); *H02J 7/855* (2026.01); *B60L 2200/10* (2013.01)

(58) Field of Classification Search
None
See application file for complete search history.

(56) References Cited

U.S. PATENT DOCUMENTS

| | | | |
|---|---|---|---|
| 8,532,854 | B2 | 9/2013 | Tate, Jr. |
| 8,963,500 | B2 | 2/2015 | Rutkowski |
| 9,627,897 | B2 | 4/2017 | Zhang |
| 10,361,571 | B2 | 7/2019 | Kim |
| 10,608,444 | B2 | 3/2020 | Kaneko |
| 10,811,869 | B2 | 10/2020 | Pevear |
| 11,271,412 | B2 | 3/2022 | Choi |
| 11,728,661 | B2 | 8/2023 | Kirleis |
| 11,815,556 | B2 | 11/2023 | Kang |

(Continued)

FOREIGN PATENT DOCUMENTS

| | | | |
|---|---|---|---|
| EP | 3922503 | B1 | 12/2022 |
| WO | 2022192396 | A1 | 9/2022 |

OTHER PUBLICATIONS

EP Search Report for EP Patent Application No. 25152921.0 dated Jun. 23, 2025.

*Primary Examiner* — Daniel Cavallari
*Assistant Examiner* — Aqeel H Bukhari
(74) *Attorney, Agent, or Firm* — Getz Balich LLC

(57) ABSTRACT

A method of operation is provided during which a pre-charge switch is closed to electrically couple a power supply to a motor controller through a pre-charge supply circuit, where a main switch is open. An electrical parameter of electricity directed through the pre-charge supply circuit is measured when the pre-charge switch is closed and the main switch is open. The main switch is closed to electrically couple the power supply to the motor controller through the main supply circuit when the electrical parameter is equal to or passes a threshold.

19 Claims, 4 Drawing Sheets

(56)                    References Cited

U.S. PATENT DOCUMENTS

| | | | |
|---|---|---|---|
| 2015/0256112 A1* | 9/2015 | Weiss | H02M 7/537 |
| | | | 318/400.3 |
| 2016/0107758 A1* | 4/2016 | Esteyne | B64D 27/34 |
| | | | 318/139 |
| 2020/0274386 A1* | 8/2020 | Kirleis | H02J 7/0025 |
| 2022/0006308 A1 | 1/2022 | Zhang | |
| 2022/0029431 A1 | 1/2022 | Mclean | |
| 2022/0115878 A1 | 4/2022 | Khozikov | |
| 2022/0140620 A1 | 5/2022 | Kang | |
| 2022/0216704 A1 | 7/2022 | Klintberg | |
| 2022/0311058 A1 | 9/2022 | Yoshida | |
| 2023/0170693 A1 | 6/2023 | Demont | |
| 2023/0182620 A1 | 6/2023 | Crosman, III | |
| 2023/0307925 A1 | 9/2023 | Ishii | |

* cited by examiner

400

Measure string parameters
402

Evaluate operability of power strings in power supply
404

Couple the power supply to motor controller using pre-charge supply switch
406

Measure electrical parameter(s) across pre-charge supply circuit
408

Couple the power supply to the motor controller using main supply switch
410

Operate electric motor
412

COUPLING AIRCRAFT ELECTRIC POWER SUPPLY TO LOAD

TECHNICAL FIELD

This disclosure relates generally to an aircraft and, more particularly, to delivering electrical power to an electric component of the aircraft.

BACKGROUND INFORMATION

Various systems and methods are known in the art for delivering electrical power to an electrical component of an aircraft. While these known systems and methods have various benefits, there is still room in the art for improvement.

SUMMARY

According to an aspect of the present disclosure, a method of operation is provided during which an aircraft system is provided. The aircraft system includes a power supply, a motor controller, a main supply circuit and a pre-charge supply circuit. The power supply includes a plurality of power strings electrically coupled in parallel. The main supply circuit and the pre-charge supply circuit are arranged in parallel between the power supply and the motor controller. The main supply circuit includes a main switch. The pre-charge supply circuit includes a pre-charge switch and is configured with a higher resistance than the main supply circuit. The pre-charge switch is closed to electrically couple the power supply to the motor controller through the pre-charge supply circuit, where the main switch is open. An electrical parameter of electricity directed through the pre-charge supply circuit is measured when the pre-charge switch is closed and the main switch is open. The main switch is closed to electrically couple the power supply to the motor controller through the main supply circuit when the electrical parameter is equal to or passes a threshold.

According to another aspect of the present disclosure, another method of operation is provided during which an aircraft system is provided. The aircraft system includes a power supply, a motor controller, a main supply circuit and a pre-charge supply circuit. The power supply includes a plurality of power strings electrically coupled in parallel. The main supply circuit and the pre-charge supply circuit are arranged in parallel between the power supply and the motor controller. The main supply circuit includes a main switch. The pre-charge supply circuit includes a pre-charge switch and is configured with a higher resistance than the main supply circuit. The pre-charge switch is closed to electrically couple the power supply to the motor controller through the pre-charge supply circuit, where the main switch is open. A period of time the pre-charge switch is closed and the main switch is open is tracked. The main switch is closed to electrically couple the power supply to the motor controller through the main supply circuit when the period of time is equal to or greater than a threshold.

According to still another aspect of the present disclosure, a system is provided for an aircraft. This aircraft system includes a power supply, a propulsion system, a main supply circuit, a pre-charge supply circuit, a sensor and a controller. The power supply includes a supply terminal and a plurality of power strings electrically coupled in parallel with the supply terminal. The propulsion system includes a motor controller and an electric motor. The motor controller is configured to selectively direct electricity output from the supply terminal to the electric motor. The motor controller includes a controller terminal and a capacitor electrically coupled to the controller terminal. The main supply circuit is electrically coupled between the supply terminal and the controller terminal. The main supply circuit includes a main switch. The pre-charge supply circuit is electrically coupled between the supply terminal and the controller terminal in parallel with the main supply circuit. The pre-charge supply circuit includes a pre-charge switch and is configured with a higher resistance than the main supply circuit. The sensor is configured to measure an electrical parameter of electricity across the pre-charge supply circuit. The controller is configured to: signal the pre-charge switch to close and electrically couple the supply terminal to the controller terminal with the main switch is open; and signal the main switch to close and electrically couple the supply terminal to the controller terminal when the electrical parameter is equal to or passes a threshold.

The closing of the main switch may include closing the main switch to electrically couple the power supply to the motor controller through the main supply circuit when: the period of time is equal to or greater than the threshold; and an electrical parameter of electricity directed across the pre-charge supply circuit, when the pre-charge switch is closed and the main switch is open, is equal to or passes a second threshold.

The electrical parameter may be an electrical current. The main switch may be closed when the electrical current is equal to or less than the threshold.

The electrical parameter may be an electrical voltage. The main switch may be closed when the electrical voltage is equal to or greater than the threshold.

The pre-charge supply circuit may also include a resistor electrically coupled inline with the pre-charge switch.

The main supply circuit may be configured without a resistor.

The motor controller may include a controller circuit and a capacitor. The controller circuit may be electrically coupled to the main supply circuit and the pre-charge supply circuit in parallel. The capacitor may be electrically coupled to the controller circuit.

The capacitor may be electrically coupled between the controller circuit and a ground.

The controller circuit may be a first controller circuit electrically coupled to a first terminal of the power supply. The motor controller may also include a second controller circuit electrically coupled to a second terminal of the power supply. The capacitor may be electrically coupled between the first controller circuit and the second controller circuit.

The method may also include directing electricity from the motor controller to an electric motor following the closing of the main switch. The aircraft system may also include the electric motor.

The method may also include driving propulsor rotor of a propulsion system using the electric motor.

The propulsion system may be configured as an electric propulsion system.

The propulsion system may be configured as a hybrid propulsion system.

The method may also include: measuring a plurality of string parameters, each of the string parameters indicative of an electrical voltage or an electrical current of string electricity output from a respective one of the power strings; and electrically coupling the power strings in parallel where the string parameters are within a range of one another.

The method may also include measuring a second electrical parameter of the electricity directed through the pre-charge supply circuit when the pre-charge switch is closed and the main switch is open. The closing of the main switch may include closing the main switch to electrically couple the power supply to the motor controller through the main supply circuit when: the electrical parameter is equal to or passes the threshold; and the second electrical parameter is equal to or passes a second threshold.

The closing of the main switch may include closing the main switch to electrically couple the power supply to the motor controller through the main supply circuit when: the electrical parameter is equal to or passes the threshold; and the pre-charge switch has been closed for at least a predetermined period of time.

The method may also include opening the pre-charge switch concurrently with or following the closing of the main switch.

Each of the power strings may be configured as or otherwise include a battery. The power supply may be configured as or otherwise include a battery bank.

The present disclosure may include any one or more of the individual features disclosed above and/or below alone or in any combination thereof.

The foregoing features and the operation of the invention will become more apparent in light of the following description and the accompanying drawings.

DETAILED DESCRIPTION

Figure 1:
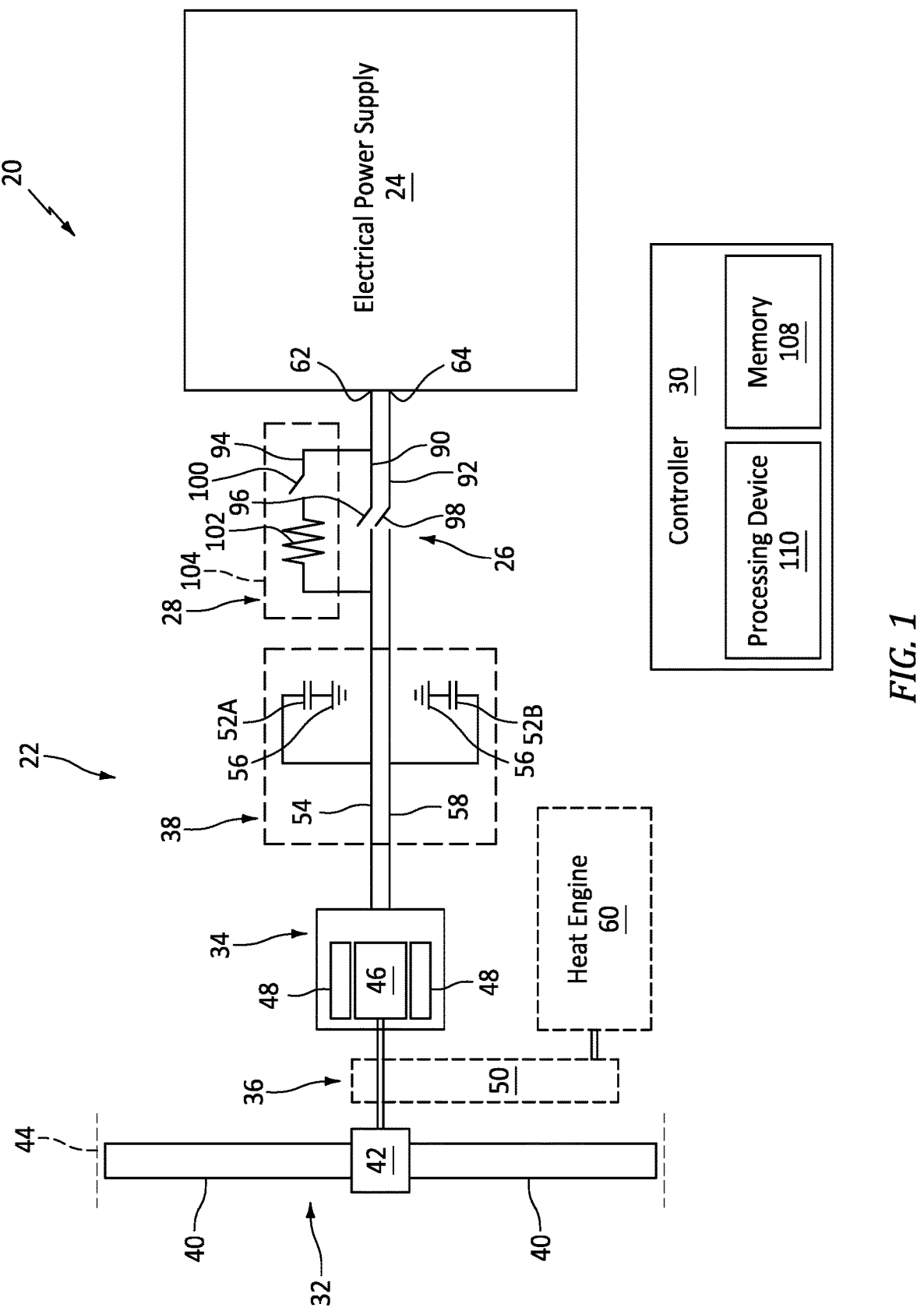
FIG. 1 is a schematic illustration of an aircraft system.

FIG. 1 illustrates a system 20 for an aircraft. The aircraft may be an airplane, a helicopter, a drone (e.g., an unmanned aerial vehicle (UAV)) or any other manned or unmanned aerial vehicle or system. The aircraft system 20 of FIG. 1 includes a propulsion system 22 for the aircraft and an electrical power supply 24 for the aircraft propulsion system 22 (see also FIG. 2). This aircraft system 20 also includes electrical circuitry 26, a sensor system 28 (see also FIG. 2) and a controller 30.

Figure 2:
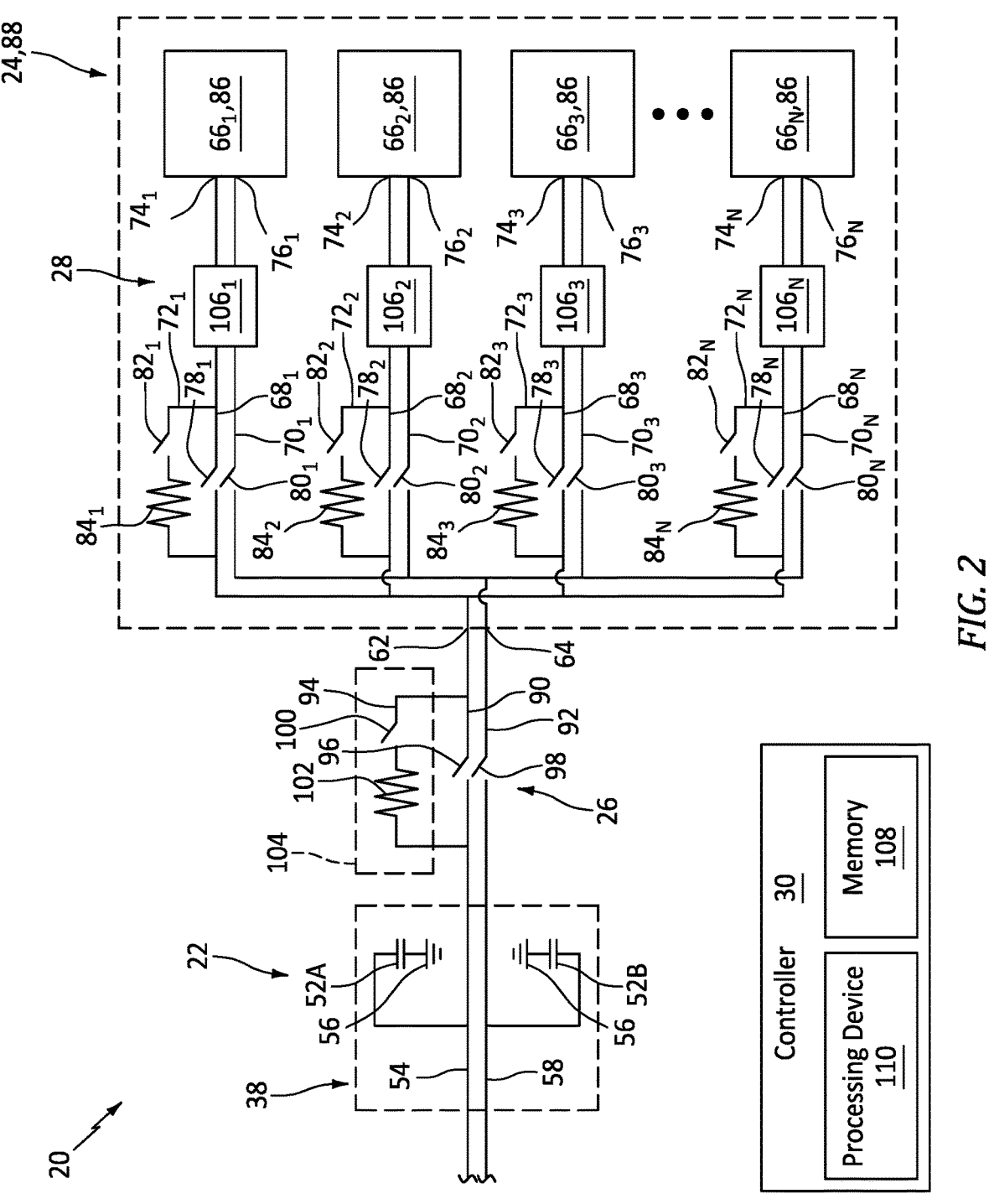
FIG. 2 is a schematic illustration of a portion of the aircraft system at a power supply.

The aircraft propulsion system 22 of FIG. 1 includes a bladed propulsor rotor 32 (e.g., an air mover), an electric motor 34 and a drivetrain 36. This aircraft propulsion system 22 also includes a motor controller 38, select portions of which are schematically shown in FIGS. 1 and 2 for ease of illustration.

The propulsor rotor 32 includes a plurality of propulsor blades 40 and a rotor base 42; e.g., a disk or a hub. The propulsor blades 40 are arranged circumferentially around the rotor base 42 in an array; e.g., a circular array. Each of the propulsor blades 40 is connected to (e.g., formed integral with or otherwise attached to) and projects radially outward from the rotor base 42. This propulsor rotor 32 may be configured as a ducted propulsor rotor. The propulsor rotor 32, for example, may be housed within and shrouded by a duct 44. An example of the ducted propulsor rotor is a fan rotor housed within a fan duct. The propulsor rotor 32 may alternatively be configured as an open propulsor rotor; e.g., an un-ducted propulsor rotor. The propulsor rotor 32, for example, may be disposed in an ambient environment external to (outside of) the aircraft propulsion system 22 and, more generally, external to the aircraft. Examples of the open propulsor rotor include a propeller rotor, a rotorcraft rotor (e.g., a main helicopter rotor), a pusher fan rotor and a propfan rotor. The present disclosure, however, is not limited to the foregoing exemplary propulsor rotor configurations.

The electric motor 34 includes an electric motor rotor 46 and an electric motor stator 48. The motor stator 48 of FIG. 1 is radially outboard of and circumscribes the motor rotor 46. With this arrangement, the electric motor 34 is configured as a radial flux electric motor. The electric motor 34 of the present disclosure, however, is not limited to such an exemplary rotor-stator configuration nor to radial flux arrangements. The motor rotor 46, for example, may alternatively be radially outboard of and circumscribe the motor stator 48. In another example, the motor rotor 46 may be axially next to the motor stator 48 configuring the electric motor 34 as an axial flux electric motor.

The drivetrain 36 of FIG. 1 operatively couples the electric motor 34 and its motor rotor 46 to the propulsor rotor 32. This drivetrain 36 may be configured as a geared drivetrain, where a geartrain 50 (e.g., a transmission, a speed change device, an epicyclic geartrain, etc.) is disposed between and operatively couples the propulsor rotor 32 to the electric motor 34 and its motor rotor 46. With this arrangement, the propulsor rotor 32 may rotate at a different (e.g., slower) rotational velocity than the motor rotor 46. However, the drivetrain 36 may alternatively be configured as a direct drive drivetrain, where the geartrain 50 is omitted. With this arrangement, the propulsor rotates at a common (the same) rotational velocity as the motor rotor 46.

Figure 3:
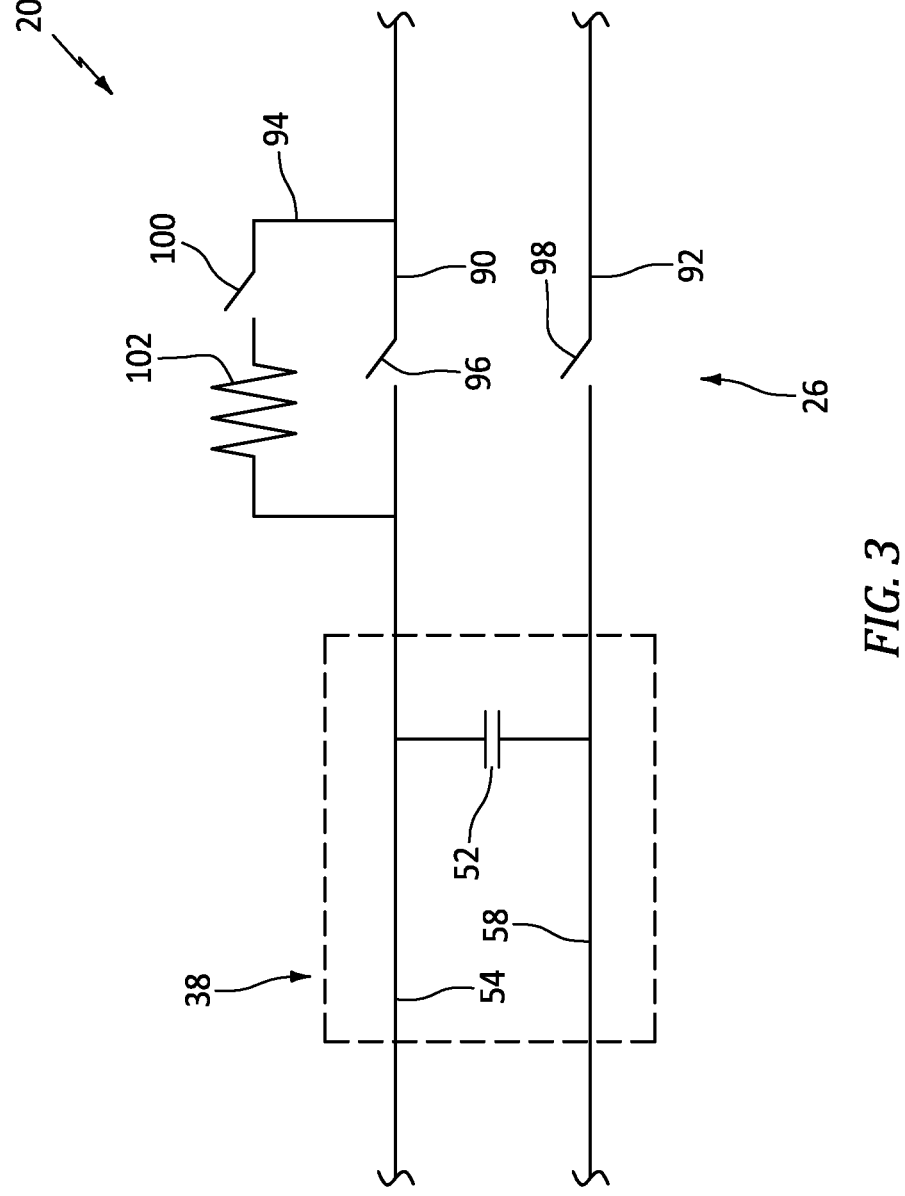
FIG. 3 is a schematic illustration of a portion of the aircraft system at a motor controller with an alternative capacitor arrangement.

The motor controller 38 is configured to control operation of the electric motor 34. The motor controller 38, for example, is configured to selectively deliver supply electricity received from the power supply 24 to the electric motor 34 and its motor stator 48. Various types and configurations of motor controllers are known in the art, and the present disclosure is not limited to any particular ones thereof. However, the motor controller 38 of FIG. 1 also includes one or more internal capacitors 52A and 52B (generally referred to as "52"); e.g., direct current (DC) link capacitors. These capacitors 52 are provided, for example, to smooth out the electricity received from the power supply 24 and provided to the electric motor 34. The positive capacitor 52A of FIG. 1 is electrically coupled between a positive circuit 54 in the motor controller 38 and a ground 56. The negative capacitor of FIG. 1 is electrically coupled between a negative circuit 58 in the motor controller 38 and the ground 56. The positive capacitor 52A and the negative capacitor 52B may be coupled together, where the coupling point between the capacitors 52 in FIG. 1 is at the ground 56; however, other coupling points are possible. The present disclosure, however, is not limited to such an exemplary arrangement. The capacitors 52 of FIG. 1, for example, may be replaced by a single common capacitor 52 (or multiple common capacitors) as shown, for example, in FIG. 3. This common capacitor 52 is electrically coupled between the controller positive circuit 54 and the controller negative circuit 58.

During operation of the aircraft propulsion system 22 of FIG. 1, the motor controller 38 selectively delivers the supply electricity output from the power supply 24 to the electric motor 34. The electric motor 34 converts the supply electricity received from the power supply 24, through the motor controller 38, into mechanical power. The motor stator 48, for example, may generate an electromagnetic field with the motor rotor 46 using the supply electricity. This electromagnetic field may drive rotation of the motor rotor 46. The motor rotor 46 and, more generally, the electric motor 34 may thereby drive rotation of the propulsor rotor 32 through the drivetrain 36. This rotation of the propulsor rotor 32 may generate aircraft thrust and/or lift. While the electric motor 34 is described above as a dedicated electric motor, the present disclosure is not limited to such an exemplary arrangement. The electric motor 34, for example, may alternatively be configured as a motor-generator. Such a motor-generator is also configured to selectively convert mechanical power into electricity, which electricity may then be provided to the power supply 24 for storage and/or to one or more other electric components of the aircraft.

The aircraft propulsion system 22 may be configured as an electric propulsion system where the electric motor 34 (or multiple of the electric motors) is/are the only component(s) operable to drive rotation of the propulsor rotor 32. Alternatively, the aircraft propulsion system 22 may be configured as a hybrid propulsion system where the electric motor 34 (or multiple of the electric motors) and a heat engine 60 are each coupled (e.g., in parallel or in series) to and operable to drive rotation of the propulsor rotor 32. Examples of the heat engine 60 include, but are not limited to, a gas turbine engine, a rotary engine (e.g., a Wankel cycle engine), a turbo-compounded internal combustion (IC) engine, or the like. Moreover, the electric motor 34 is described herein as driving rotation of the propulsor rotor 32 for ease of description. It is contemplated, however, the electric motor 34 may also or alternatively drive rotation of (e.g., mechanically drive/power operation of) one or more other mechanical loads; e.g., a pump, a generator, a rotor in an aircraft engine (e.g., for engine startup), etc.

Referring to FIG. 2, the power supply 24 includes a positive terminal 62, a negative terminal 64 and N number of electrical power strings $66_1$-$66_N$ (generally referred to as "66"), where N may be any number equal to or greater than one or two. This power supply 24 includes a set of a positive main string circuit $68_1$-$68_N$ (generally referred to as "68") and a negative main string circuit $70_1$-$70_N$ (generally referred to as "70") for each of the power strings $66_1$-$66_N$. The power supply 24 may also include a positive pre-charge string circuit $72_1$-$72_N$ (generally referred to as "72") for each of the power strings $66_1$-$66_N$.

Each of the power strings $66_1$-$66_N$ includes a positive terminal $74_1$-$74_N$ (generally referred to as "74") and a negative terminal $76_1$-$76_N$ (generally referred to as "76"). Each pair of the positive main string circuit 68 and the respective pre-charge string circuit 72 are electrically coupled in parallel between a respective one of the string positive terminals 74 and the supply positive terminal 62. Each pair of the positive main string circuit 68 and the respective pre-charge string circuit 72 are thereby operable to electrically couple the respective string positive terminal 74 to the supply positive terminal 62. Each negative main string circuit 70 is electrically coupled between a respective one of the string negative terminals 76 and the supply negative terminal 64. Each negative main string circuit 70 is thereby operable to electrically couple the respective string negative terminal 76 to the supply negative terminal 64. With this arrangement, the power strings 66 are electrically couplable in parallel with one another within the power supply 24. Note, while each pre-charge string circuit 72 is shown in FIG. 2 as being coupled in parallel with a respective one of the positive main string circuits 68, each pre-charge string circuits 72 may alternatively be coupled in parallel with a respective one of the negative main string circuits 70.

Each of the positive main string circuits $68_1$-$68_N$ may include a positive main string switch $78_1$-$78_N$ (generally referred to as "78"); e.g., a contactor, a relay, etc. When this positive main string switch 78 is open, the respective string positive terminal 74 is electrically decoupled from the supply positive terminal 62 through the respective positive main string circuit 68. However, when the positive main string switch 78 is closed, the respective string positive terminal 74 is electrically coupled to the supply positive terminal 62 through the respective positive main string circuit 68.

Each of the negative main string circuits $70_1$-$70_N$ may include a negative main string switch $80_1$-$80_N$ (generally referred to as "80"); e.g., a contactor, a relay, etc. When this negative main string switch 80 is open, the respective string negative terminal 76 is electrically decoupled from the supply negative terminal 64 through the respective negative main string circuit 70. However, when the negative main string switch 80 is closed, the respective string negative terminal 76 is electrically coupled to the supply negative terminal 64 through the respective negative main string circuit 70.

Each of the pre-charge string circuits $72_1$-$72_N$ may include a positive pre-charge string switch $82_1$-$82_N$ (generally referred to as "82"); e.g., a contactor, a relay, etc. When this positive pre-charge string switch 82 is open, the respective string positive terminal 74 is electrically decoupled from the supply positive terminal 62 through the respective positive pre-charge string circuit 72. However, when the positive pre-charge string switch 82 is closed, the respective string positive terminal 74 is electrically coupled to the supply positive terminal 62 through the respective positive pre-charge string circuit 72. Each of the pre-charge string circuits $72_1$-$72_N$ may also include a string resistor $84_1$-$84_N$ (generally referred to as "84") which provides that pre-charge string circuit 72 with a higher resistance than the respective positive main string circuit 68, which positive main string circuit 68 may be configured without a resistor. Each string resistor 84 of FIG. 2 is electrically coupled in line serially between the positive pre-charge string switch 82 and the supply positive terminal 62. One or more or all of the string resistors 84, however, may alternatively each be electrically coupled between in line serially between the positive pre-charge string switch 82 and the respective string positive terminal 74.

Each of the power strings 66 may be configured as or otherwise include a battery 86. The power supply 24 may be configured as or otherwise include a battery bank 88; e.g., a bank of the batteries 86. The present disclosure, however, is not limited to such an exemplary power supply configuration. One or more of the power strings 66, for example, may alternatively be configured as or otherwise also or alternatively include a supercapacitor, a fuel cell and/or another electrical power storage device and/or electrical power delivery device.

The supply positive terminal 62 and the supply negative terminal 64 may form an outlet for the power supply 24. This supply outlet is electrically coupled to the motor controller 38 through the electrical circuitry 26. The electrical circuitry 26 of FIG. 2, for example, includes a positive main supply circuit 90, a negative main supply circuit 92 and a positive pre-charge supply circuit 94. The positive main supply circuit 90 and the pre-charge supply circuit 94 are electrically coupled in parallel between the supply positive terminal 62 and a terminal for the controller positive circuit 54. The positive main supply circuit 90 and the pre-charge supply circuit 94 are thereby operable to electrically couple the supply positive terminal 62 to the motor controller 38 and its controller positive circuit 54. The negative main supply circuit 92 is electrically coupled between the supply negative terminal 64 and a terminal for the controller negative circuit 58. The negative main supply circuit 92 is thereby operable to electrically couple the supply negative terminal 64 to the motor controller 38 and its controller negative circuit 58. Note, while the pre-charge supply circuit 94 is shown in FIG. 2 as being coupled in parallel with the positive main supply circuit 90, the pre-charge supply circuit 94 may alternatively be coupled in parallel with the negative main supply circuit 92.

The positive main supply circuit 90 may include a positive main supply switch 96; e.g., a contactor, a relay, etc. When this positive main supply switch 96 is open, the supply positive terminal 62 is electrically decoupled from the motor controller 38 and its controller positive circuit 54 through the positive main supply circuit 90. However, when the positive main supply switch 96 is closed, the supply positive terminal 62 is electrically coupled to the motor controller 38 and its controller positive circuit 54 through the positive main supply circuit 90.

The negative main supply circuit 92 may include a negative main supply switch 98; e.g., a contactor, a relay, etc. When this negative main supply switch 98 is open, the supply negative terminal 64 is electrically decoupled from the motor controller 38 and its controller negative circuit 58 through the negative main supply circuit 92. However, when the negative main supply switch 98 is closed, the supply negative terminal 64 is electrically coupled to the motor controller 38 and its controller negative circuit 58 through the negative main supply circuit 92.

The positive pre-charge supply circuit 94 may include a positive pre-charge supply switch 100; e.g., a contactor, a relay, etc. When this positive pre-charge supply switch 100 is open, the supply positive terminal 62 is electrically decoupled from the motor controller 38 and its controller positive circuit 54 through the positive pre-charge supply circuit 94. However, when the positive pre-charge supply switch 100 is closed, the supply positive terminal 62 is electrically coupled to the motor controller 38 and its controller positive circuit 54 through the positive pre-charge supply circuit 94. The pre-charge supply circuits 94 may also include a supply resistor 102 which provides that pre-charge supply circuit 94 with a higher resistance than the positive main supply circuit 90, which positive main supply circuit 90 may be configured without a resistor. The supply resistor 102 of FIG. 2 is electrically coupled in line serially between the positive pre-charge supply switch 100 and the motor controller 38 and its controller positive circuit 54. The supply resistor 102, however, may alternatively be electrically coupled between in line serially between the positive pre-charge supply switch 100 and the supply positive terminal 62.

Referring to FIG. 1, the sensor system 28 includes a pre-charge supply circuit sensor 104 (schematically shown). This pre-charge supply circuit sensor 104 is arranged with the positive pre-charge supply circuit 94. Referring to FIG. 2, the sensor system 28 also includes a plurality of string sensors $106_1$-$106_N$ (generally referred to as "106"). Each of these string sensors 106 is associated with a respective one of the power strings $66_1$-$66_N$. More particularly, each of the string sensors 106 is arranged with a respective set of the main string circuits 68 and 70. Each of the string sensors 106 of FIG. 2, for example, is electrically coupled between the respective power string 66 and a respective set of the main string switches 78 and 80.

Each of the sensors 104, 106 is configured to measure one or more electrical parameters; e.g., electrical current, electrical voltage, etc. Each sensor 104, 106, for example, may be configured as a current sensor which measures an electrical current and/or a voltage sensor which measures an electrical voltage. The pre-charge supply circuit sensor 104 may thereby measure the electrical current and/or the electrical voltage of supply electricity output from the power supply 24 to the motor controller 38 across the positive pre-charge supply circuit 94. Each of the string sensors 106 may similarly measure the electrical current and/or the electrical voltage of string electricity output from a respective one of the power strings 66 across the respective set of the main string circuits 68 and 70.

The controller 30 of FIGS. 1 and 2 is in signal communication (e.g., hardwired and/or wirelessly coupled) with the sensors 104, 106 as well as each of the switches 78, 80, 82, 96, 98 and 100. The controller 30 may be configured as an onboard controller for the aircraft propulsion system 22; e.g., an electronic control unit (ECU), an electronic engine controller (EEC), a full-authority digital engine controller (FADEC), etc. The controller 30 may be implemented with a combination of hardware and software. The hardware may include memory 108 and at least one processing device 110, which processing device 110 may include one or more single-core and/or multi-core processors. The hardware may also or alternatively include analog and/or digital circuitry other than that described above.

The memory 108 is configured to store software (e.g., program instructions) for execution by the processing device 110, which software execution may control and/or facilitate performance of one or more operations such as those described in the methods below. The memory 108 may be a non-transitory computer readable medium. For example, the memory 108 may be configured as or include a volatile memory and/or a nonvolatile memory. Examples of a volatile memory may include a random access memory (RAM) such as a dynamic random access memory (DRAM), a static random access memory (SRAM), a synchronous dynamic random access memory (SDRAM), a video random access memory (VRAM), etc. Examples of a nonvolatile memory may include a read only memory (ROM), an electrically erasable programmable read-only memory (EEPROM), a computer hard drive, etc.

Figure 4:
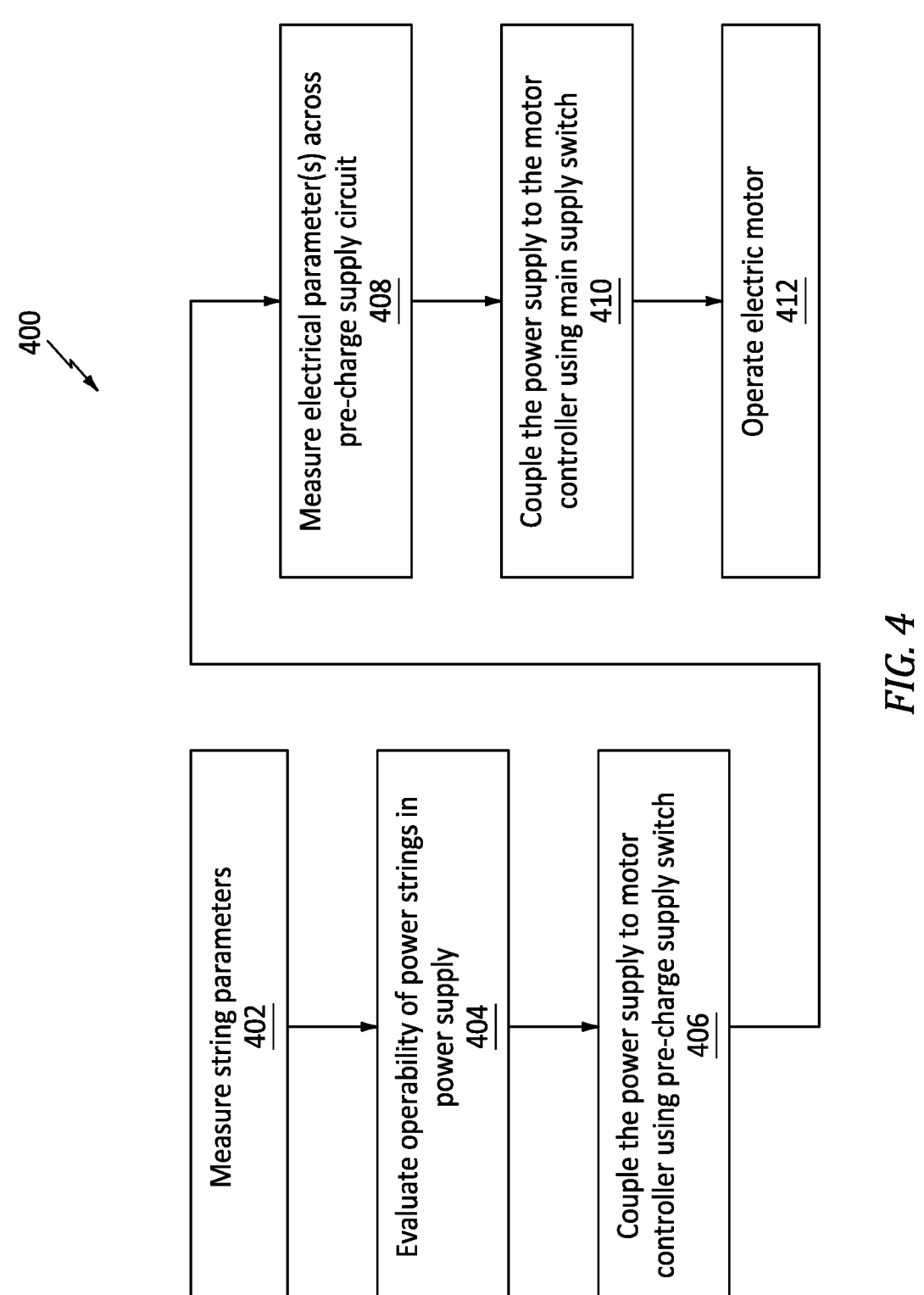
FIG. 4 is a flow diagram of a method of operation for an aircraft system.

FIG. 4 is a flow diagram of a method 400 of operation for an aircraft system. For ease of description, the operating method 400 of FIG. 4 is described below with reference to the aircraft system 20 of FIGS. 1 and 2. The operating method 400 of the present disclosure, however, is not limited to such an exemplary aircraft system arrangement.

In step 402, a plurality of string parameters are measured using the sensor system 28. For ease of description, the string parameters are described below as string voltages; however, the present disclosure is not limited thereto. Each of the string sensors 106, for example, may measure the electrical voltage (the electrical parameter) of the string electricity output from and/or stored by each power string 66. Each string voltage may be indicative of (e.g., equal to, derived from, correlated to, etc.) the measured electrical voltage associated with a respective one of the power strings 66. The string voltage (the string parameter) may then be communicated to the controller 30 through a respective sensor output signal from each of the string sensors 106.

In step 404, operability of the power strings 66 are evaluated. The controller 30, for example, may compare the individual string voltages (the string parameters) to one another. Where those string voltages are all within a (e.g., predetermined or variable) range of one another (e.g., all within 2% or 5% of one another), the controller 30 may determine the power strings 66 are properly functioning. Under such circumstances, the controller 30 may signal each set of the main string switches 78 and 80 to close to electrically couple the power strings 66 to the supply outlet in parallel. In some embodiments, prior to signaling the positive main string switches 78 to close, the controller 30 may first signal the positive pre-charge string switches 82 to the close as described below, for example, with respect to the positive pre-charge supply switch 100.

In step 406, the supply outlet is electrically coupled to the motor controller 38 using the positive pre-charge supply circuit 94. The controller 30, for example, may signal the positive pre-charge supply switch 100 and the negative main supply switch 98 to close. The controller 30 may also signal the positive main supply switch 96 to open, or remain open if already open. During this step 406, the controller 30 may also signal the motor controller 38 to depower the electric motor 34, or keep the electric motor 34 depowered. In other words, during the step 406, the motor controller 38 may be operated such that little or no electrical power is delivered to the electric motor 34. The power supply 24 may thereby pre-charge the capacitors 52 (or the common capacitor 52 of FIG. 3). Moreover, by directing the supply electricity across the positive pre-charge supply circuit 94 and its supply resistor 102, the supply resistor 102 may reduce current surge to the capacitors 52 (or the common capacitor 52 of FIG. 3).

In step 408, an electrical parameter of the supply electricity directed across/along the positive pre-charge supply circuit 94 is measured using the sensor system 28. The pre-charge supply circuit sensor 104, for example, may measure the electrical parameter of the supply electricity directed across/along the positive pre-charge supply circuit 94. The electrical parameter may then be communicated to the controller 30 through a respective sensor output signal from the pre-charge supply circuit sensor 104. As the capacitors 52 (or the common capacitor 52 of FIG. 3) become charged, the electrical parameter may change; e.g., the electrical current decreases, the electrical voltage increases, a voltage delta between the source and the load decreases, etc.

In step 410, the supply outlet is electrically coupled to the motor controller 38 using the positive main supply circuit 90. For example, when the electrical parameter is equal to or passes a (e.g., predetermined or variable) threshold (e.g., where the electrical current is equal to or decreases below the threshold, where the electrical voltage is equal to or increases above the threshold, etc.), the controller 30 may signal the positive main supply switch 96 to close. Here, the electrical parameter may be indicative of (e.g., equal to, derived from, correlated to, etc.) the electric current or electric voltage across/along the positive pre-charge supply circuit 94. The controller 30 may also signal the negative main supply switch 98 to remain closed. Simultaneously or following the closure of the positive main supply switch 96, the controller 30 may also signal the positive pre-charge supply switch 100 to open. The supply electricity may thereby be delivered to the motor controller 38 without additional resistance associated with the positive pre-charge supply circuit 94 and its supply resistor 102.

In step 412, the electric motor 34 is operated; e.g., powered up, energized, etc. The controller 30, for example, may signal the motor controller 38 to selectively deliver the supply electricity to the electric motor 34. Typically, the electric motor 34 is (e.g., only) operated following the performance of (or concurrently with the performance of) the step 410.

The steps 408 and 410 are generally described above with respect to measuring and operating based on a single electrical parameter; e.g., electrical current (e.g., surge current) or electrical voltage. The steps 408 and 410, however, may alternatively measure and operate based on multiple electrical parameters; e.g., the electrical current and the electrical voltage. In addition or alternatively, the controller 30 may track a period of time that the positive pre-charge supply switch 100 is closed. The controller 30 than then signals the positive main supply switch 96 to close (and the positive pre-charge supply switch 100 to open) after the period of time is equal to or greater than a predetermined threshold period of time. Of course, when multiple parameters are monitored (e.g., one or more electrical parameters and/or time), the controller 30 may (e.g., only) signal the switch to close (and the positive pre-charge supply switch 100 to open) after each threshold has been satisfied (or alternatively after any one or more of the thresholds has been satisfied).

While various embodiments of the present disclosure have been described, it will be apparent to those of ordinary skill in the art that many more embodiments and implementations are possible within the scope of the disclosure. For example, the present disclosure as described herein includes several aspects and embodiments that include particular features. Although these features may be described individually, it is within the scope of the present disclosure that some or all of these features may be combined with any one of the aspects and remain within the scope of the disclosure. Accordingly, the present disclosure is not to be restricted except in light of the attached claims and their equivalents.

What is claimed is:

1. A method of operation, comprising:

providing an aircraft system including a power supply, a motor controller, a main supply circuit and a pre-charge supply circuit, the power supply including a plurality of power strings electrically coupled in parallel, the motor controller including a controller circuit electrically coupled to the main supply circuit and the pre-charge supply circuit in parallel and a capacitor electrically coupled to the controller circuit, the main supply circuit and the pre-charge supply circuit arranged in parallel between the power supply and the motor controller, the main supply circuit comprising a main switch, and the pre-charge supply circuit comprising a pre-charge switch and configured with a higher resistance than the main supply circuit;

closing the pre-charge switch to electrically couple the power supply to the motor controller through the pre-charge supply circuit, wherein the main switch is open;

measuring an electrical parameter of electricity directed through the pre-charge supply circuit when the pre-charge switch is closed and the main switch is open; and closing the main switch to electrically couple the power supply to the motor controller through the main supply circuit when the electrical parameter is equal to or passes a threshold.

2. The method of claim 1, wherein the electrical parameter comprises an electrical current; and the main switch is closed when the electrical current is equal to or less than the threshold.

3. The method of claim 1, wherein the electrical parameter comprises an electrical voltage; and the main switch is closed when the electrical voltage is equal to or greater than the threshold.

4. The method of claim 1, wherein the pre-charge supply circuit further comprises a resistor electrically coupled inline with the pre-charge switch.

5. The method of claim 1, wherein the main supply circuit is configured without a resistor.

6. The method of claim 1, wherein the capacitor is electrically coupled between the controller circuit and a ground.

7. The method of claim 1, wherein the controller circuit is a first controller circuit electrically coupled to a first terminal of the power supply, and the motor controller further includes a second controller circuit electrically coupled to a second terminal of the power supply; and the capacitor is electrically coupled between the first controller circuit and the second controller circuit.

8. The method of claim 1, further comprising:

directing electricity from the motor controller to an electric motor following the closing of the main switch;

the aircraft system further including the electric motor.

9. The method of claim 8, further comprising driving propulsor rotor of a propulsion system using the electric motor.

10. The method of claim 9, wherein the propulsion system is configured as an electric propulsion system.

11. The method of claim 9, wherein the propulsion system is configured as a hybrid propulsion system.

12. The method of claim 1, further comprising:

measuring a plurality of string parameters, each of the plurality of string parameters indicative of an electrical voltage or an electrical current of string electricity output from a respective one of the plurality of power strings; and electrically coupling the plurality of power strings in parallel where the plurality of string parameters are within a range of one another.

13. The method of claim 1, further comprising:

measuring a second electrical parameter of the electricity directed through the pre-charge supply circuit when the pre-charge switch is closed and the main switch is open; and the closing of the main switch comprising closing the main switch to electrically couple the power supply to the motor controller through the main supply circuit when the electrical parameter is equal to or passes the threshold; and the second electrical parameter is equal to or passes a second threshold.

14. The method of claim 1, wherein the closing of the main switch comprises closing the main switch to electrically couple the power supply to the motor controller through the main supply circuit when the electrical parameter is equal to or passes the threshold; and the pre-charge switch has been closed for at least a predetermined period of time.

15. The method of claim 1, further comprising opening the pre-charge switch concurrently with or following the closing of the main switch.

16. The method of claim 1, wherein each of the plurality of power strings comprises a battery; and the power supply comprises a battery bank.

17. A method of operation, comprising:

providing an aircraft system including a power supply, a motor controller, a main supply circuit and a pre-charge supply circuit, the power supply including a plurality of power strings electrically coupled in parallel, the motor controller including a controller circuit electrically coupled to the main supply circuit and the pre-charge supply circuit in parallel and a capacitor electrically coupled to the controller circuit, the main supply circuit and the pre-charge supply circuit arranged in parallel between the power supply and the motor controller, the main supply circuit comprising a main switch, and the pre-charge supply circuit comprising a pre-charge switch and configured with a higher resistance than the main supply circuit;

closing the pre-charge switch to electrically couple the power supply to the motor controller through the pre-charge supply circuit, wherein the main switch is open;

tracking a period of time the pre-charge switch is closed and the main switch is open; and closing the main switch to electrically couple the power supply to the motor controller through the main supply circuit when the period of time is equal to or greater than a threshold.

18. The method of claim 17, wherein the closing of the main switch comprises closing the main switch to electrically couple the power supply to the motor controller through the main supply circuit when the period of time is equal to or greater than the threshold; and an electrical parameter of electricity directed across the pre-charge supply circuit when the pre-charge switch is closed and the main switch is open is equal to or passes a second threshold.

19. A system for an aircraft, comprising:

a power supply including a supply terminal and a plurality of power strings electrically coupled in parallel with the supply terminal;

a propulsion system including a motor controller and an electric motor, the motor controller configured to selectively direct electricity output from the supply terminal to the electric motor, and the motor controller including a controller terminal and a capacitor electrically coupled to the controller terminal;

a main supply circuit electrically coupled between the supply terminal and the controller terminal, the main supply circuit comprising a main switch;

a pre-charge supply circuit electrically coupled between the supply terminal and the controller terminal in parallel with the main supply circuit, the pre-charge supply circuit comprising a pre-charge switch and configured with a higher resistance than the main supply circuit;

a sensor configured to measure an electrical parameter of electricity across the pre-charge supply circuit, the electrical parameter comprises an electrical current; and a controller configured to signal the pre-charge switch to close and electrically couple the supply terminal to the controller terminal with the main switch is open; and signal the main switch to close and electrically couple the supply terminal to the controller terminal when the electrical parameter is equal to or less than a threshold.

\* \* \* \* \*